United States Patent
Rajaraman

(10) Patent No.: US 9,286,387 B1
(45) Date of Patent: Mar. 15, 2016

(54) DOUBLE ITERATIVE FLAVORED RANK

(75) Inventor: Anand Rajaraman, Palo Alto, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 343 days.

(21) Appl. No.: 11/165,623

(22) Filed: Jun. 22, 2005

Related U.S. Application Data

(60) Provisional application No. 60/644,325, filed on Jan. 14, 2005.

(51) Int. Cl.
- *G06F 7/00* (2006.01)
- *G06F 17/30* (2006.01)
- *G06Q 30/02* (2012.01)

(52) U.S. Cl.
CPC ...... *G06F 17/30864* (2013.01); *G06F 17/3071* (2013.01); *G06F 17/30321* (2013.01); *G06F 17/30598* (2013.01); *G06F 17/30867* (2013.01); *G06Q 30/02* (2013.01)

(58) Field of Classification Search
USPC .................................................. 707/726, 748
See application file for complete search history.

(56) References Cited

U.S. PATENT DOCUMENTS

| | | | |
|---|---|---|---|
| 6,285,999 B1 * | 9/2001 | Page | 707/5 |
| 6,460,049 B1 | 10/2002 | Becker et al. | |
| 6,507,843 B1 | 1/2003 | Dong et al. | |
| 6,549,896 B1 | 4/2003 | Candan et al. | |
| 6,601,075 B1 | 7/2003 | Huang et al. | |
| 6,990,628 B1 | 1/2006 | Palmer et al. | |
| 7,043,422 B2 | 5/2006 | Gao et al. | |
| 7,072,846 B1 * | 7/2006 | Robinson | 705/10 |
| 7,080,073 B1 | 7/2006 | Jiang et al. | |
| 7,260,573 B1 * | 8/2007 | Jeh | G06F 17/30613 707/708 |
| 7,269,587 B1 | 9/2007 | Page | |
| 7,281,005 B2 * | 10/2007 | Canright et al. | 707/5 |
| 7,318,057 B2 | 1/2008 | Aridor et al. | |
| 7,739,209 B1 * | 6/2010 | Rajaraman | 706/20 |
| 8,396,864 B1 * | 3/2013 | Harinarayan et al. | 707/722 |
| 8,498,999 B1 * | 7/2013 | Bhalotia | 707/767 |
| 8,849,830 B1 * | 9/2014 | Srinivasan et al. | 707/740 |
| 2002/0156779 A1 | 10/2002 | Elliott et al. | |
| 2002/0168664 A1 | 11/2002 | Murray et al. | |
| 2003/0212691 A1 | 11/2003 | Kuntala et al. | |
| 2004/0030688 A1 | 2/2004 | Aridor et al. | |
| 2004/0193698 A1 * | 9/2004 | Lakshminarayana | 709/218 |
| 2005/0004889 A1 * | 1/2005 | Bailey et al. | 707/1 |
| 2005/0080795 A1 | 4/2005 | Kapur et al. | |
| 2005/0144162 A1 | 6/2005 | Liang | |
| 2005/0216533 A1 | 9/2005 | Berkhin | |

(Continued)

OTHER PUBLICATIONS

Borodin et al., Finding Authorities and Hubs From Link Structures on the World Wide Web, In Proceedings of the Tenth International World Wide Web Conference, Jan. 18, 2002.

(Continued)

*Primary Examiner* — Hexing Liu
(74) *Attorney, Agent, or Firm* — Bryan Cave LLP

(57) ABSTRACT

Determining the relevance of a web node is disclosed. A seed score value of a first type is assigned to a seed set of nodes. A score value of a second type is derived for the web node based on a mapping of a reachability relationship between one or more seed nodes and the web node. A score value of the first type is derived for the web node based on a mapping of a reachability relationship between the web node and one or more evaluation nodes having derived weight values of the second type.

12 Claims, 10 Drawing Sheets

(56) References Cited

U.S. PATENT DOCUMENTS

| | | | |
|---|---|---|---|
| 2005/0256832 A1* | 11/2005 | Zhang et al. | 707/1 |
| 2005/0256860 A1* | 11/2005 | Eiron et al. | 707/4 |
| 2006/0085788 A1 | 4/2006 | Amir et al. | |
| 2006/0248031 A1 | 11/2006 | Kates et al. | |
| 2006/0294124 A1 | 12/2006 | Cho | |
| 2007/0168135 A1 | 7/2007 | Agarwal et al. | |

OTHER PUBLICATIONS

Taher H. Haveliwala, Topic-Sensitive PageRank: A Context-Sensitive Ranking Algorithm for Web Search, In Proceedings of the Eleventh International World Wide Web Conference, 2002.
Jeh et al., Scaling Personalized Web Search, In Proceedings of the Twelfth International World Wide Web Conference, 2003.
Jon M. Kleinberg, Authoritative Sources in a Hyperlinked Environment, Journal of the ACM, 1999.
Lempel et al., The Stochastic Approach for Link-Structure Analysis (SALSA) and the TKC Effect, 2000.
Ng et al., Stable Algorithms for Link Analysis, In Proceedings the Twenty-Fourth Annual International ACM SIGIR Conference, 2001.
Page el al., The PageRank Citation Ranking: Bringing Order to the Web, 1998.
Richardson et al., The Intelligent Sufer: Probabilistic Combination of Link and Content Information in PageRank, 2002.
Soumen Chakrabarti, Mining the Web: Discovering Knowledge from Hypertext Data, 2002.
U.S. Appl. No. 11/327,294, filed Jan. 6, 2006, Anand Rajaraman.
Huang et al., X., "Identification of Clusters in the Web Graph Based on Link Topology", 2003.
Eiron et al., N., "Ranking the Web Frontier", 2004.
Bergmark et al., D., "Focused Crawls, Tunneling, and Digital Libraries", 2002.
Candan et al., K., "Reasoning for Web Document Associates and its Application in Site Map Construction". 2002.

* cited by examiner

DOUBLE ITERATIVE FLAVORED RANK

CROSS REFERENCE TO OTHER APPLICATIONS

This application claims priority to U.S. Provisional Patent Application No. 60/644,325 entitled DIFR: A SCHEME FOR TOPIC-SENSITIVE RELEVANCE RANKING filed Jan. 14, 2005, which is incorporated herein by reference for all purposes.

BACKGROUND OF THE INVENTION

Search engines, such as are used in conjunction with the World Wide Web, are typically expected to search through vast amounts of data, yet return a manageable number of quality, relevant results. When attempting to determine which results are most relevant to a user, search engines generally evaluate prospective results for such factors as the number of occurrences of a search term and how close to the top of the document the search term occurs. In some cases, query-independent scores are assigned to individual documents. For example, a query-independent score may be assigned to a page based on the number of other pages which link to it. Such scores may also be taken into account by the search engine when attempting to return the most relevant results.

In some cases, the relevancy of a particular result may depend on the context of the query. For example, suppose that a user submits a query of "jaguar price." A query-independent score does not differentiate results based on context and thus the same hits will be returned to the user, irrespective of whether that user is interested in the car, the cat, or the operating system. There thus exists a continuing need to be able to provide relevant results in response to queries.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
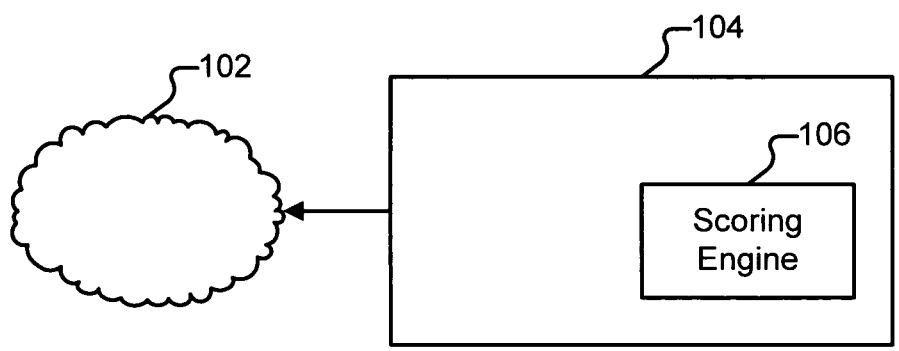
FIG. 1 illustrates an embodiment of a scoring engine.

FIG. 1 illustrates an embodiment of a scoring engine. In the example shown, collection 102 is a group of World Wide Web pages, and is crawled and indexed by a search system 104. Hereinafter, when an operation is discussed as being performed on each document in collection 102, it should be understood that the operation may instead be performed on a subset of collection 102, as applicable. The documents in collection 102 are also referred to herein as "web nodes" and "web pages." In some embodiments, collection 102 includes documents found on an intranet. Documents found in collection 102 can include, but are not limited to text files, multimedia files, and other content. Search system 104 may be a single device, or its functionality may be provided by multiple devices. Elements typically provided in a search system, such as an indexer and a repository, are not shown but may be included.

Each document in collection 102 can be thought of as serving two functions: that of a source, and that of a destination. Scoring engine 106 assigns a source score and a destination score to each document in collection 102 based in part on how good of a source and destination, respectively, that document is. As described more fully below, the scores can be recursively defined in terms of each other.

These source and destination scores can be used to rank pages, for example in response to a search query, based on a variety of functions. In some cases, the source and destination scores of each page are combined into a single score using a weighted average. In some cases, the source scores are ignored and only the destination score is used. In some cases, good sources and good destinations are listed separately in the search results.

Figure 2A:
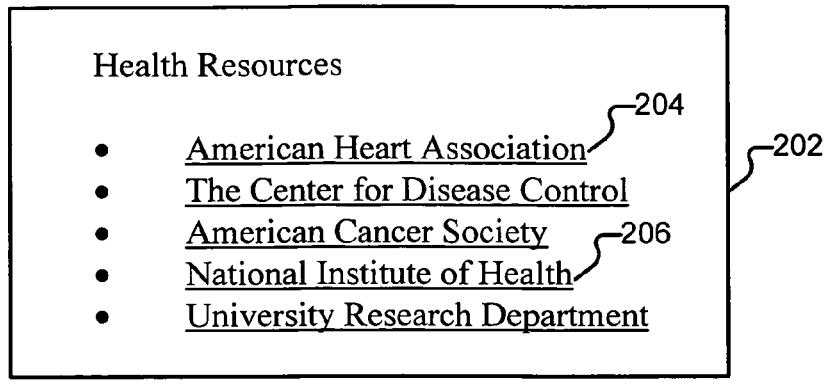
FIG. 2A illustrates an embodiment of a source.

FIG. 2A illustrates an embodiment of a source. In the example shown, a web page 202, titled "Health Resources,"

contains a number of hyperlinks to websites, such as the American Heart Association (204) and the National Institute of Health (206).

A page can be defined as a "good" source for a topic (e.g., diabetes) if good destinations are "reachable" from it. Thus, a page is a good source for a topic if it guides a visitor in the direction of good destination pages for that topic. A good source need not (but may) contain authoritative information about a topic.

In the example shown in FIG. 2A, the American Heart Association page is reachable by web page 202. This is so because web page 202 contains a direct link (204) to the American Heart Association page. Pages do not need to be directly linked to have reachability, however.

Figure 2B:
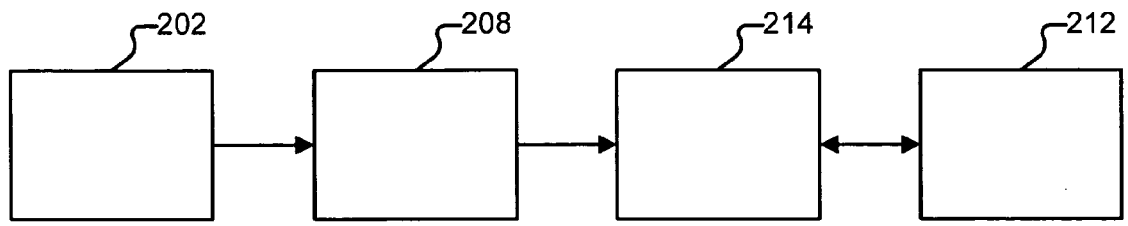
FIG. 2B illustrates an embodiment of pages having reachability.

FIG. 2B illustrates an embodiment of pages having reachability. The Health Resources page (202) contains a link to a University Research Department page (208). The University Research Department contains links to home pages for some of the individual researchers at the institution, such as page 214. In the example shown, a researcher has written page 212, a medical journal article on treating diabetes, which is linked to from the researcher's main page. Page 212 is thus reachable from page 202. As discussed more fully below, the reachability of a page can be conceptualized as the probability that a random surfer beginning on a first page will wind up on a second page.

Figure 2C:
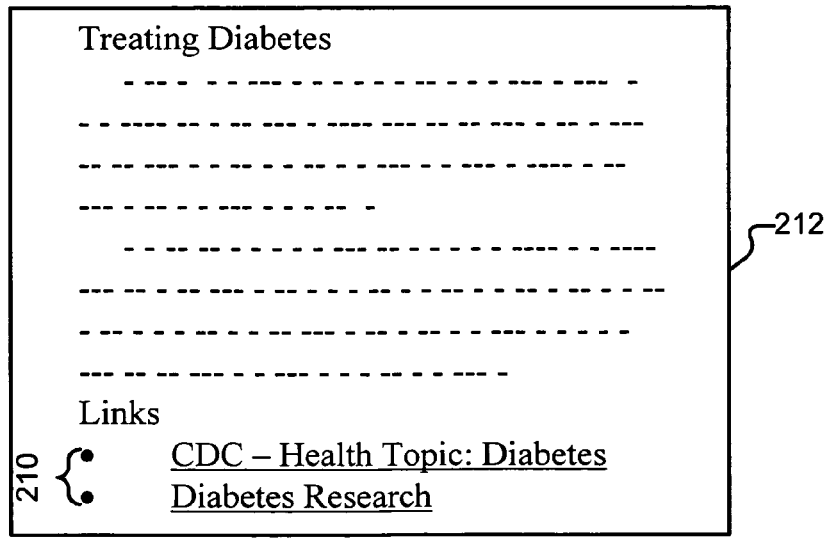
FIG. 2C illustrates an embodiment of a destination.

FIG. 2C illustrates an embodiment of a destination. In the example shown, a web page 212, titled "Treating Diabetes," contains information about treating diabetes. A page can be defined as a "good" destination if it contains useful information about a topic and if that information is likely to be relevant to searches associated with that topic. The example shown also contains hyperlinks to other documents (210), though such links are not necessary for a page to be a good destination. In some cases, a page may simultaneously be a good source and a good destination. This is the case, for example, with page 212, because it presents information about the treatment of diabetes and also includes links for finding additional information about the topic.

Figure 3:
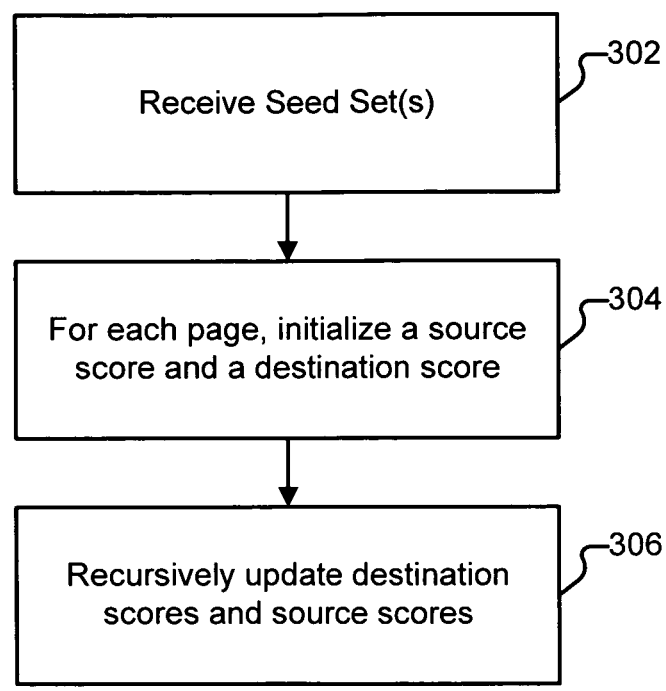
FIG. 3 illustrates an embodiment of a process for scoring documents.

FIG. 3 illustrates an embodiment of a process for scoring documents. This process may be implemented in scoring engine 106. In the example shown, the process begins at 302 when one or more seed sets is received. The seed set can either be a seed set "S" of sources for a given topic, or a seed set "D" of destinations for a given topic. In some embodiments, both source and destination sets are received at 302. In some embodiments, the seed sets are selected by a human and include pages that are considered to be useful or relevant to the topic. In some embodiments, the seed sets are created at least in part based on a directory service, such as by creating a set based on links in a Directory Mozilla (DMOZ) category.

The pages included in sets S and D for a topic may be dynamic. For example, as better sources for a topic are located, they may replace or join previously selected seeds in S. Likewise, better destinations—ones with more relevant information or deeper treatment of a topic—may replace or join previously selected seeds in D. As described more fully below, in some embodiments, updating the seed sets occurs automatically, as part of a process for calculating source and destination scores for documents in collection 102.

The dynamic nature of seed sets can be especially important for providing relevant results to queries in topics where authoritative pages are likely to link only to "approved" content, such as positive or flattering information about that topic. Examples include sports teams, music groups, movies, famous personalities (e.g., actors, politicians, movie directors, etc.), companies, and polarized political issues, such as abortion rights. Team websites do not routinely link to fan pages, nor are such pages even reachable from team websites despite the fact that fan pages may contain highly useful and flattering information about a team. The websites of companies such as airlines and hotels do not generally link to (or reach) companies which provide similar services, yet a user interested in travel would generally benefit in a more complete picture of his or her carrier and lodging options. Similarly, an official movie website is unlikely to link to negative reviews of the movie or boycott sites such as moviexsucks.com which can provide potentially valuable information (including rumor and innuendo) about the movie in question.

The documents in collection 102 can be represented as a directed graph. In this example, the graph has N nodes, where N corresponds to the number of documents in collection 102. The directed connections between nodes represent the links between documents. For a particular page, p, Out(p) is the set of outlinks that lead from the page to other pages. These can be represented in the directed graph as forward links of a node p. Similarly, In(p) is the set of inlinks that lead from other pages to page p. These can be represented in the directed graph as backward links of a node p.

For example, in FIG. 2B, document 202 has one outlink. Documents 208 and 212 both have one inlink and one outlink. Document 214 has two inlinks and one outlink.

At 304, for each document in collection 102, a source score and a destination score are initialized. One method of initializing the scores is through use of the following formula:

$$s(p) \begin{cases} \frac{N}{|S|} & \text{if } p \in S \\ 0 & \text{if } p \notin S \end{cases} \quad (1)$$

$$d(p) \begin{cases} \frac{1}{|D|} & \text{if } p \in D \\ 0 & \text{if } p \notin D \end{cases}$$

Where:
s(p) is the source score of a page p
d(p) is the destination score of a page p
p is a document in a collection
S is a set of source seeds
D is a set of destination seeds
N is the total number of documents in the collection In this example, vectors s and d encode the source and destination scores of a particular page p in collection 102, respectively. As explained above, N is the total number of documents, such as the total number of documents in collection 102. In some cases, N may instead be the number of pages in a subset of collection 102. In this example, each source seed in S is equally weighted and each destination seed in D is equally weighted. In some embodiments, other methods may be used for initialization, such as by setting specific values for particular pages. This may be the case, for example, where particular seed destinations in D are significantly "better" than other seed destinations in D.

At 306, the destination and source scores of the documents in collection 102 are recursively updated. In the example shown, this is accomplished through use of a random surfer model.

In a typical random surfer model (referred to herein as the unbiased model, performed by an unbiased surfer), a surfer starts at a random page on the web and begins surfing. If the surfer is currently at page p, the page q that the surfer visits at the next time step is determined in the unbiased model as follows: with probability β, the surfer picks a link uniformly at random from the set of outlinks of p, and follows it to reach a new page; with probability 1-β, the surfer randomly teleports to a page picked uniformly at random from all of the pages on the World Wide Web. The value β is typically set to 0.85.

For each page p in collection 102, the probability that the unbiased surfer visits p at the current time step converges to a value that depends only on the link structure of the web. This probability is the unbiased stationary probability of page p and is referred to herein as the "unbiased stationary probability" of page p. The vector r that lists, for each page, its unbiased stationary probability is referred to herein as the unbiased stationary probability vector r, and can be given as:

$$r = \beta A r + (1-\beta) u \quad (2)$$

Where:
r is the unbiased stationary probability vector
β is a probability, typically set to 0.85
A is a matrix that encodes the link structure of a collection
u is a vector corresponding to uniform random teleportation If there are N pages in collection 102, u has N entries, each equal to 1/N.

Destination Score

Suppose a random surfer preferentially teleports to good sources, rather than teleporting in an unbiased fashion, such as is given above. In this case, the probability that the surfer teleports to a particular page p can be set proportional to the source score of p, s(p). Thus, the surfer teleports to each source with a probability proportional to its source score. A teleport vector for the surfer can be written as $$\frac{s}{|s|},$$

with the factor $$\frac{1}{|s|}$$

normalizing the sum of all the probabilities to 1.

In this example, the link structure of collection 102 is encoded using a matrix A. In general, if page j links to page i, then $$A_{ij} = \frac{1}{|Out(j)|},$$

and if not, $A_{ij}=0$. A vector b of stationary probabilities for this "biased" walk can be defined by the following formula:

$$b = \beta A b + \frac{(1-\beta)}{|s|} s \quad (3)$$

Where:
b is a biased stationary probability vector
β is a probability, typically set to 0.85
A is a matrix that encodes the link structure of a collection
s is a source score vector With probability β, the surfer picks a link uniformly at random from the outlinks of p and follows it to reach a new page. With probability 1-β, the surfer teleports to a source s. In this example, every page in collection 102 has at least one outlink. In practice, some pages do not contain outlinks. In that case, such pages can be eliminated using successive sink elimination, and the stationary probability values can be modified as appropriate.

In this example, the destination score of a particular page p (denoted d(p)) is equal to b(p), the page's stationary probability in this biased walk.

Source Score

Destination scores can be used to compute source scores. Suppose a random surfer has a teleport set that consists only of page p. In such a case, the teleport vector $v_p$ has 1 corresponding top and 0 corresponding to all other pages. Here, the surfer teleports periodically to page p and continues the random walk from p. This type of walk is referred to hereinafter as a random surfer centered on p and the stationary probability $r_p$ for this random surfer can be given as:

$$r_p = \beta A r_p + (1-\beta) v_p \quad (4)$$

Where:
$r_p$ is a stationary probability vector centered on p
β is a probability, typically set to 0.85
A is a matrix that encodes the link structure of a collection
$v_p$ is a teleport vector centered on p This equation is actually a set of N equations, one for each page p in collection 102.

The source score of a particular page p can be defined in this example as $r_p(p)$, the stationary probability that the random surfer is on a good destination page (as measured by the goodness of its destination score). Conceptually, a source score is important if important destinations have received a significant portion of their destination scores from the source. One way of defining the source score is given below:

$$s(p) = \sum_{q \in N} r_p(q) d(q) \quad (5)$$

Where:
s(p) is the source score of a page p
$r_p(q)$ is a stationary probability with respect to p of q
d(q) is the destination score of a page q Here, set N is the set of all pages in collection 102, and page q is a document in collection 102. The source score of a particular page p is calculated by summing the stationary probability with respect top of each page q multiplied by the destination score of q. To simplify notation in this example, the source score of p can be written as:

$$s(p) = r_p^T \cdot d \quad (6)$$

In some cases, a popular page q, such as www.yahoo.com, will have a high r(q), where r is the unbiased stationary probability vector, defined above in Equation 2. Because www.yahoo.com has such a high unbiased stationary probability overall, there is a high probability that it will also have a high value of $r_p(q)$. In general, a page p should not be given credit for leading to a universally popular destination, such as www.yahoo.com. One way to correct for this is to define a relative stationary probability of q with respect top, denoted $w_p(q)$, by:

$$w_p(q) = \frac{r_p(q)}{r(q)} \quad (7)$$

Where:

$w_p(q)$ is the relative stationary probability of a page q with respect to a page p $r_p(q)$ is a stationary probability with respect to p of q $r(q)$ is the unbiased probability of a page q.

The source score of p can then be written as:

$$s(p) = \sum_{q \in P} \frac{r_p(q)}{r(q)} d(q) = w_p^T \cdot d \quad (8)$$

Where:

s(p) is the source score of a page p $r_p(q)$ is a stationary probability with respect to p of q r(q) is the unbiased probability of a page q d(q) is the destination score of a page q P is a collection of pages The above definitions of source and destination score allow the source and destination scores to diffuse away from the original seed set. Without correction, the diffusion can quickly lead to topic drift and topic generalization. Topic drift occurs when the set of sources gets "contaminated" by pages that are not relevant to the topic at hand. A related problem is topic generalization. For example, suppose a ranking for the topic "marathon running" is constructed. Many pages on running and other outdoor activities are likely to link to sites about marathons. Such sites will likely receive high source scores, thereby recursively enlarging the destination sites. The result is that the ranking may be for the broader topic of "running" rather than the desired topic of "marathon running."

Two parameters, $\rho$ and $\phi$ can be chosen that control how much weight to assign new sources and destinations, as opposed to those in the original seed sets. The parameter $\rho$ is known as the destination expansion factor and the parameter $\phi$ is known as the source expansion factor. These factors allow some of the probability contained with the seed sets to spread out into documents in collection 102 that were not originally seeds, while retaining a portion of the probability within the seed sets. Thus, the parameters allow for the control of how much a final source or destination score of a page p will depend on the original seed sets.

Here, $0 \leq \rho \leq 1$ and $0 \leq \phi \leq 1$. Using these parameters, the destination score and source score equations can be written, respectively, as:

$$d(p) = \begin{cases} \frac{\rho}{|D|} + (1-\rho)b(p) & \text{if } p \in D \\ (1-\rho)b(p) & \text{if } p \notin D \end{cases} \quad (9)$$

$$s(p) = \begin{cases} \frac{N\phi}{|S|} + (1-\phi)w_p^T \cdot d & \text{if } p \in S \\ (1-\phi)w_p^T \cdot d & \text{if } p \notin S \end{cases} \quad (10)$$

Where:

d(p) is the destination score of a page p s(p) is the source score of a page p $\rho$ is a value between 0 and 1, inclusive ($0 \leq \rho \leq 1$)

$\phi$ is a value between 0 and 1, inclusive ($0 \leq \phi \leq 1$)

p is a document in a collection

S is a set of source seeds

D is a set of destination seeds

In this example, $\rho$ and $\phi$ are the percentage of the scores remain within their respective, original, sets, and 1-$\rho$ and 1-$\phi$ are the percentage of the scores may drift out. There are a few special cases that can occur depending on how the $\rho$ and $\phi$ values are selected. If $\rho$ and $\phi$ are both set to 1, the source and destination scores will be held constant at their initial values. If $\rho$ and $\phi$ are both set to 0, unbiased source and destination scores result. If $\rho$ is set to 1 and $\phi$ is set to 0, the destination set will be fixed and only the source scores will vary. If $\rho$ is set to 0 and $\phi$ is set to 1, the source scores will be constant and only the destination scores will vary.

The equations presented in conjunction with portion 306 of FIG. 3 are given in part to help conceptualize a process for computing source and destination scores. While the equations presented can be used to compute source and destination scores, to do so would require, for each page p, a very large number of computations, especially when collection 102 is large. As described more fully below, in some embodiments, more efficient processes are employed to iteratively calculate source and destination scores, such as are described in conjunction with FIGS. 5 and 6.

Figure 4A:
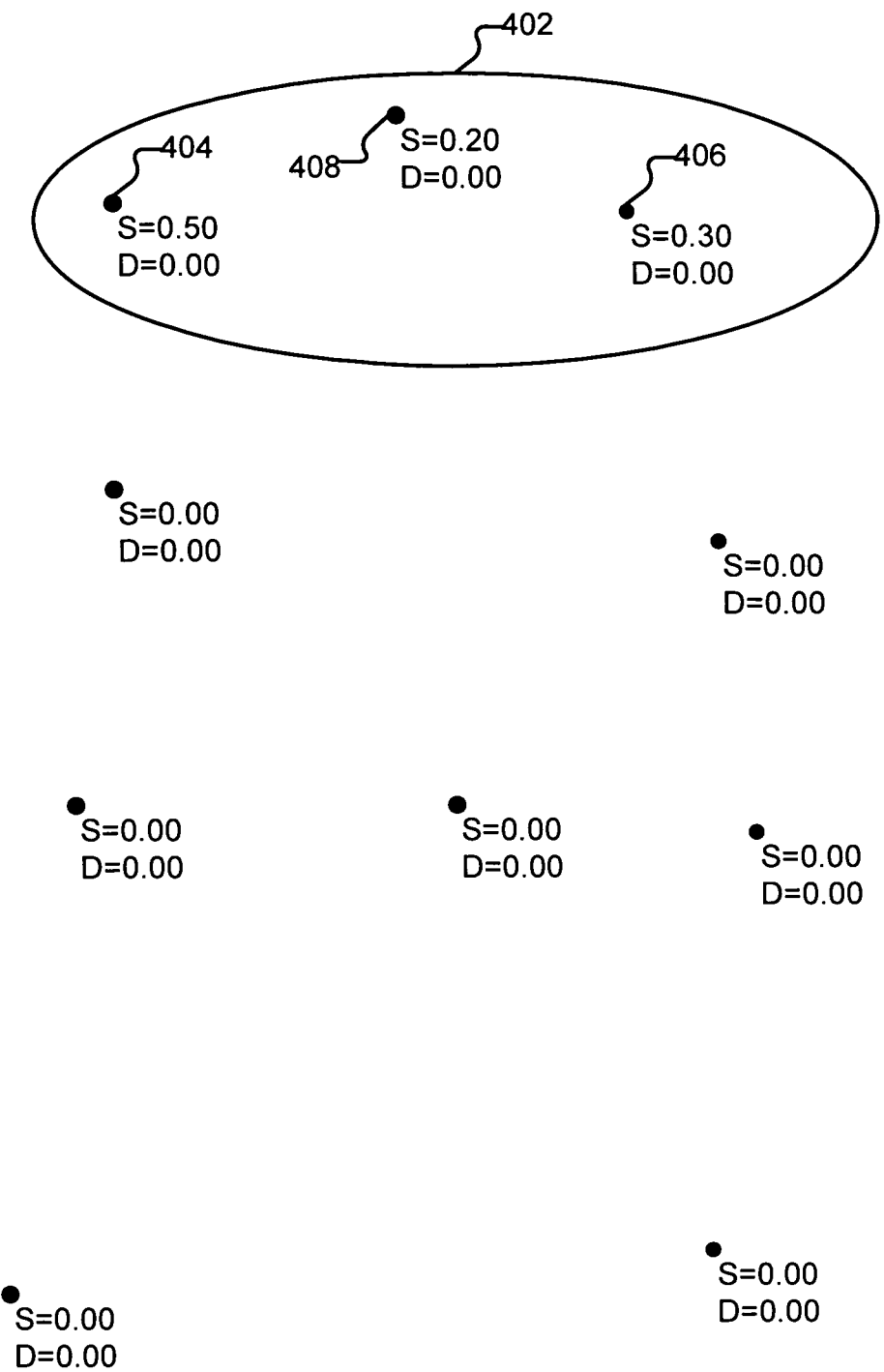
FIG. 4A illustrates a simplified embodiment of a portion of a process for assigning scores to a collection of documents based on a source set.
Figure 4B:
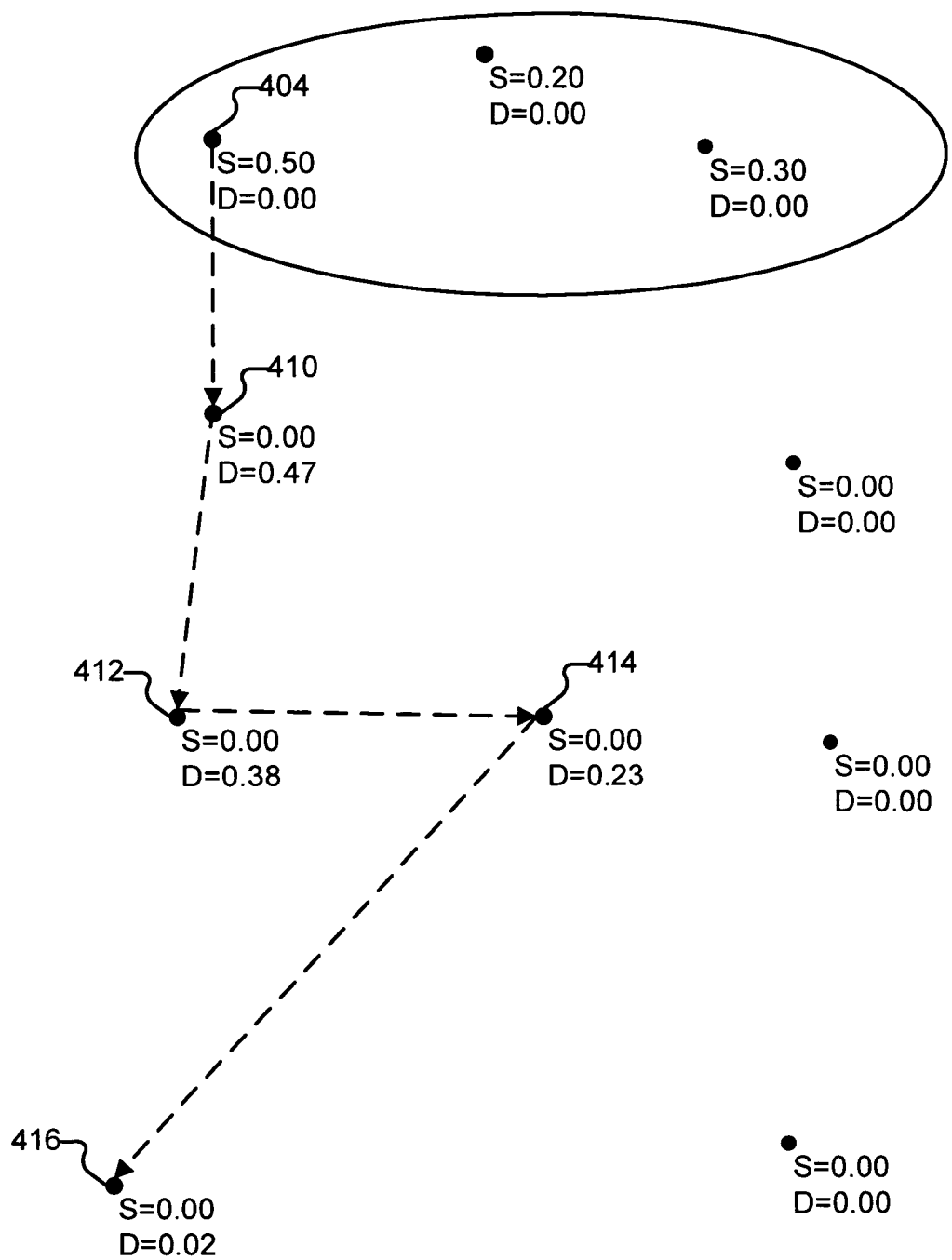
FIG. 4B illustrates a simplified embodiment of a portion of a process for assigning scores to a collection of documents based on a source set.
Figure 4C:
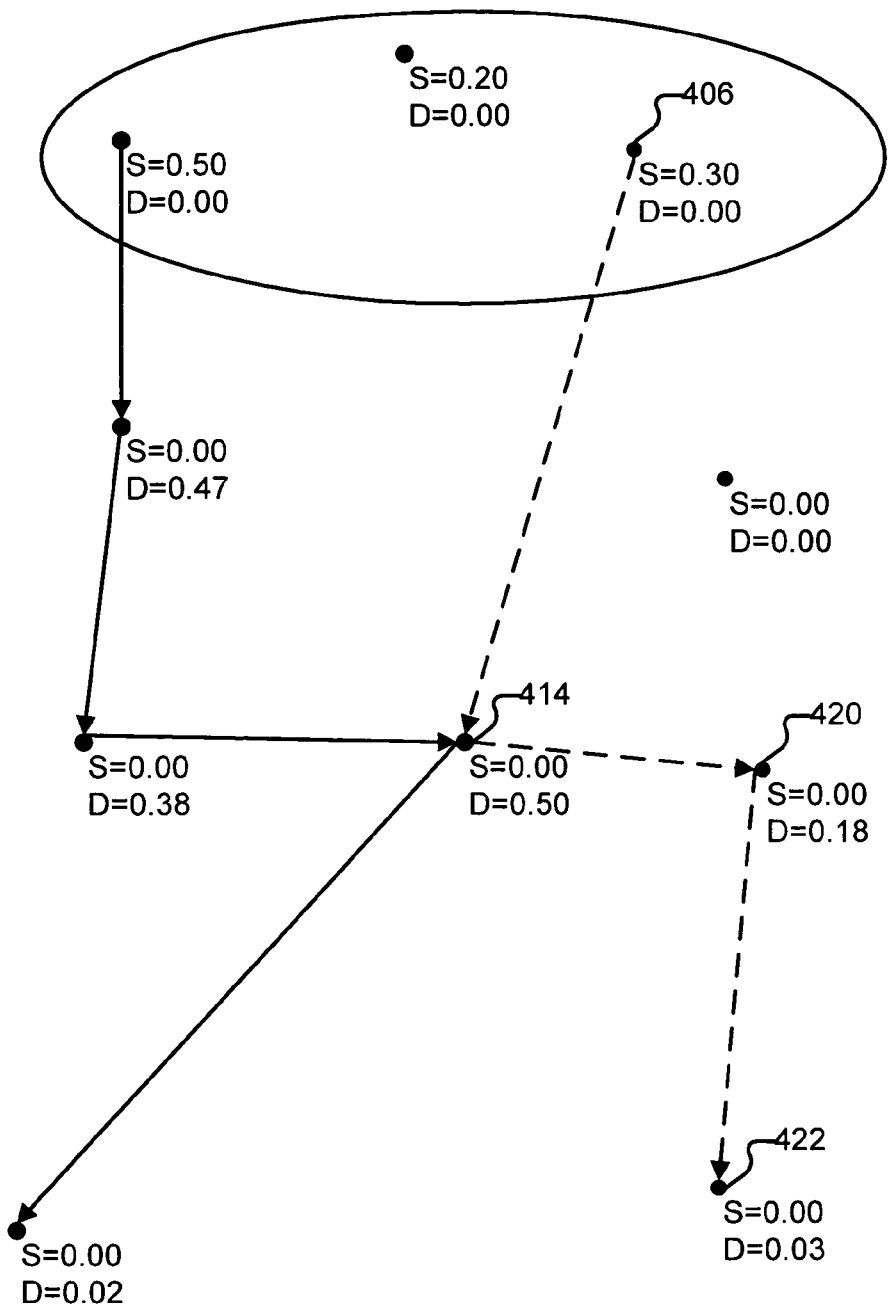
FIG. 4C illustrates a simplified embodiment of a portion of a process for assigning scores to a collection of documents based on a source set.
Figure 4D:
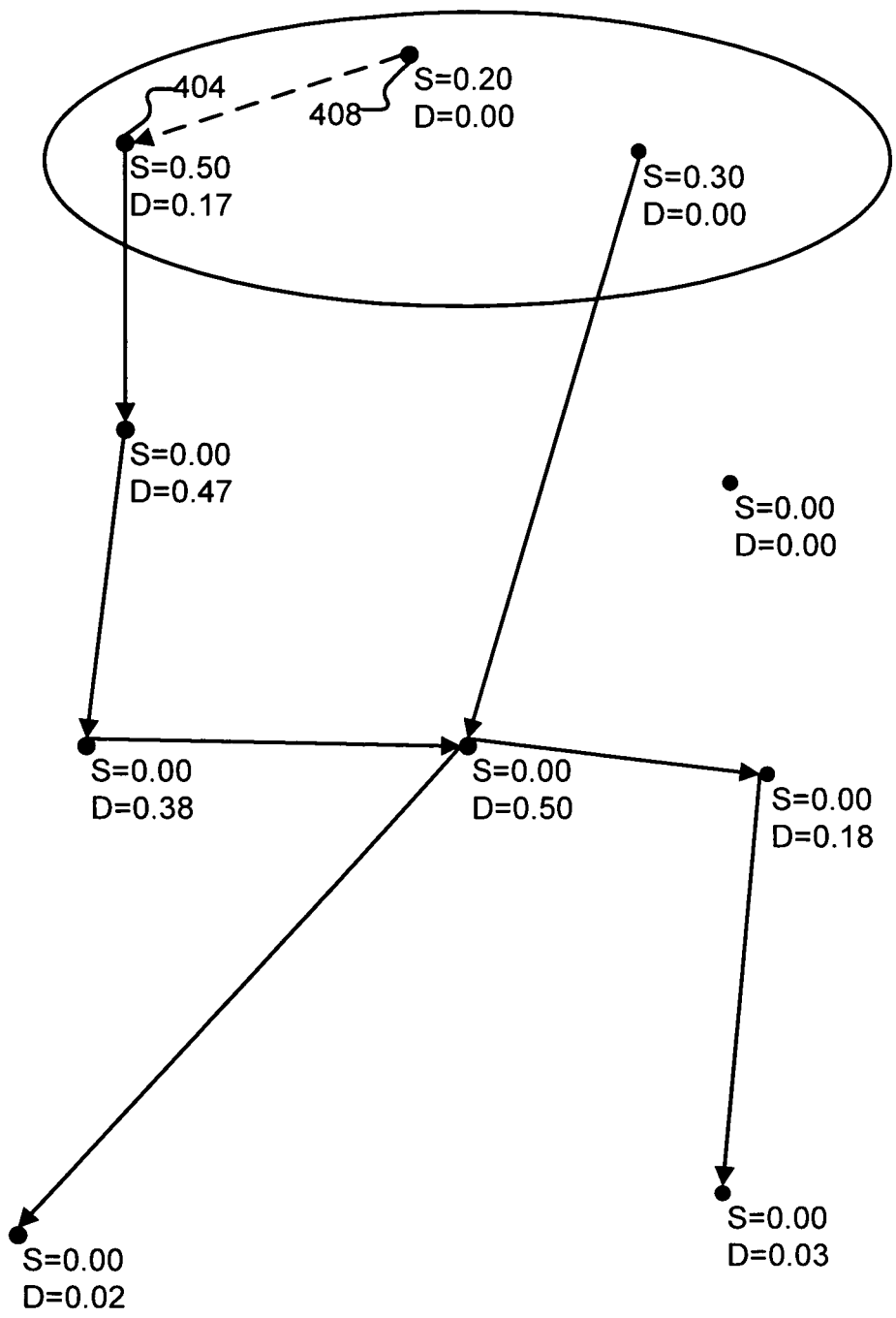
FIG. 4D illustrates a simplified embodiment of a portion of a process for assigning scores to a collection of documents based on a source set.
Figure 4E:
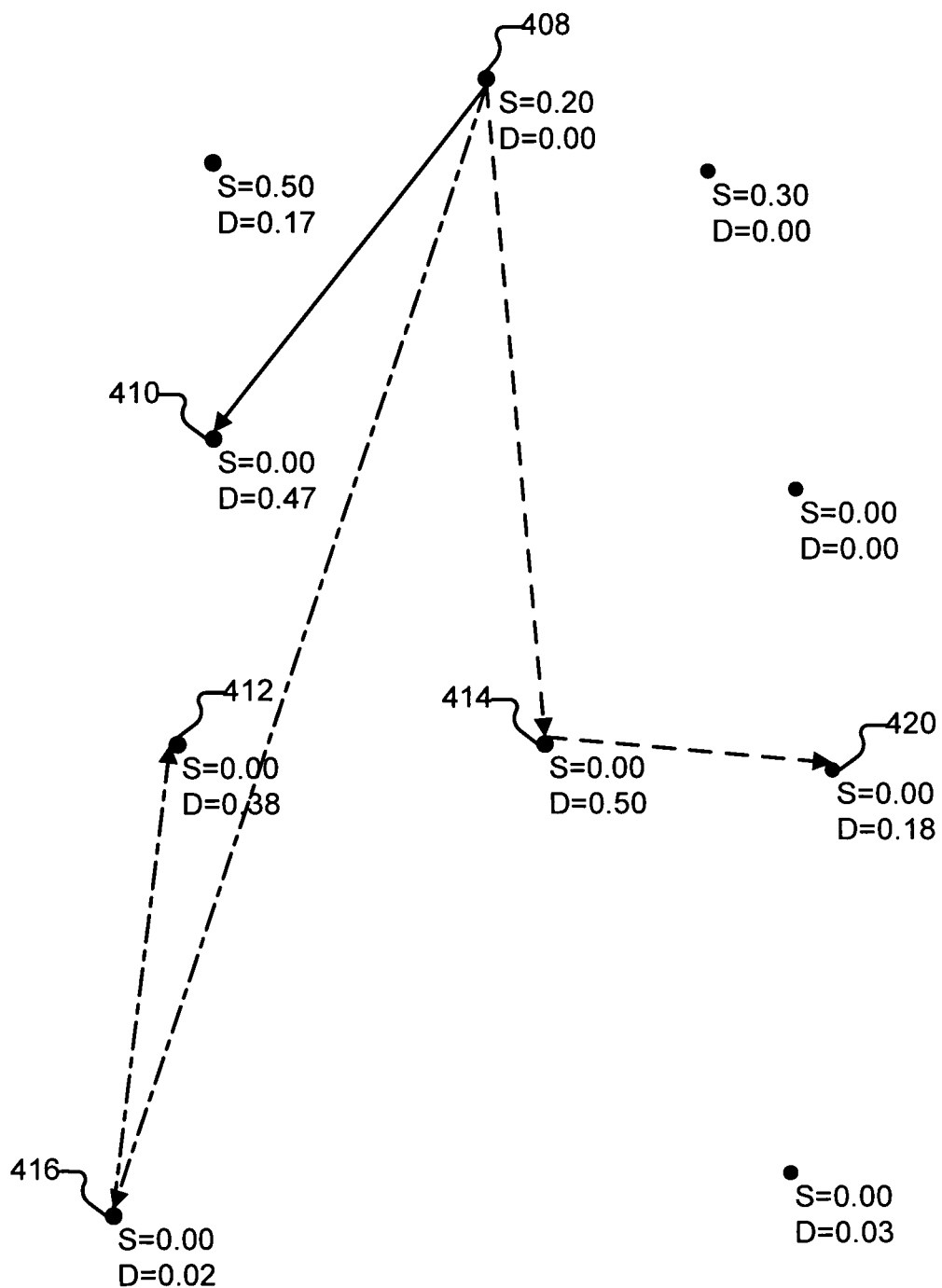
FIG. 4E illustrates a simplified embodiment of a portion of a process for assigning scores to a collection of documents based on a source set.
Figure 5:
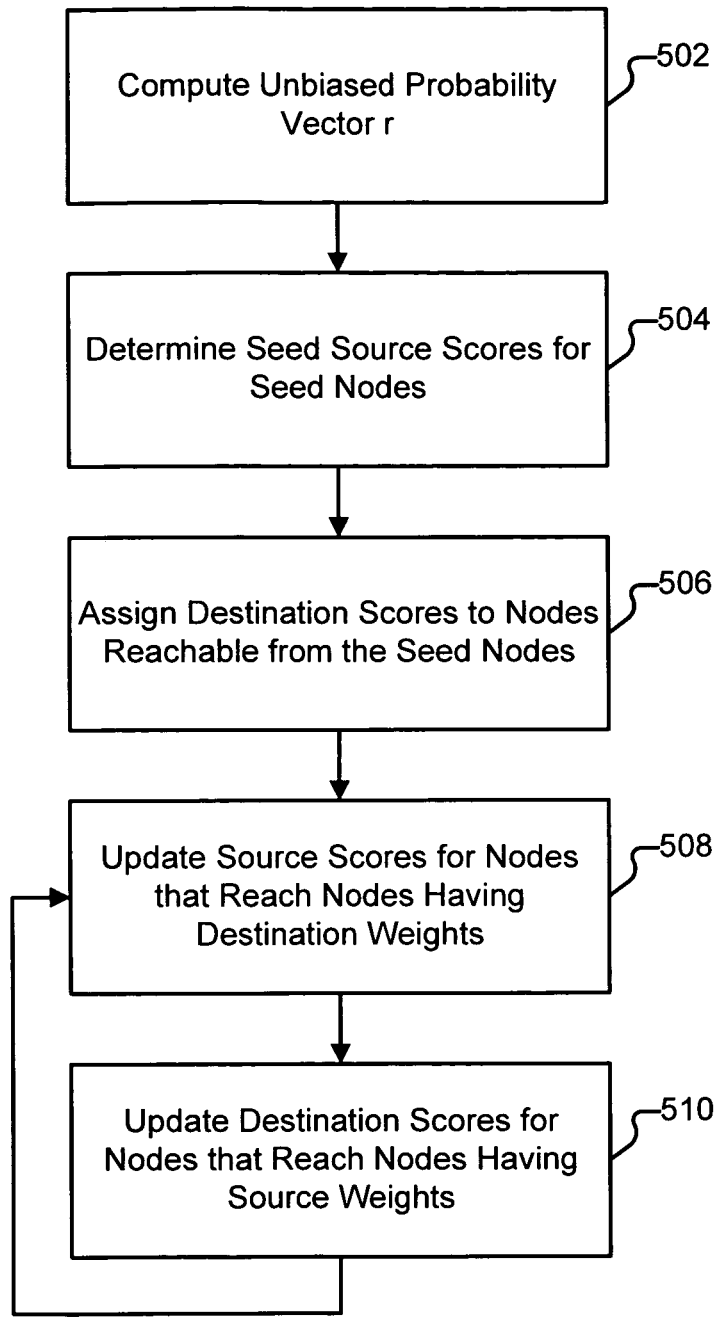
FIG. 5 illustrates an embodiment of a process for assigning scores to a collection of documents based on a source set.

A simplified numeric example of an iterative version of the process shown in FIGS. 3 and 5 is given in FIGS. 4A-4E to help illustrate the process conceptually.

FIG. 4A illustrates a simplified embodiment of a portion of a process for assigning scores to a collection of documents based on a source set. The process depicted in FIG. 4A could be an example of an implementation of portions 302 of FIGS. 3 and 504 of FIG. 5 as applied to collection 102. The example shown uses a simplified numerical method for calculating destination scores (d(q)) that are reached during a series of random walks beginning at each node p in the seed set. In the example shown, each node q that is visited during a random walk originating at p is assigned a score given by $d(q)=s(p)-0.1(i^2)$, where i is the distance from the particular source seed p, and s(p) is the source score of that p. Here, distance is defined as the number of hops q is away from p. In this example, if a particular q is visited by multiple ps, the resulting destination scores are summed. If a computed value of a d(q) is negative, in this example, it is set to 0.

For simplicity of illustration, the values given in FIGS. 4A-4E are not normalized to maintain a unity, and are significantly larger than they would likely be in practice, where millions of documents may be included in collection 102.

In the example shown, nodes 404, 406, and 408 are included in a source seed set 402. Their source seed values are 0.5, 0.3, and 0.2, respectively. Their destination scores are each 0. The other nodes in collection 102 have their source and destination scores initialized to 0.

FIG. 4B illustrates a simplified embodiment of a portion of a process for assigning scores to a collection of documents based on a source set. The process depicted in FIG. 4B could be an example of an implementation of 306 of FIGS. 3 and 506 of FIG. 5. A random walk beginning at node 404 is performed. The first page reached from node 404 is node 410. Node 410 thus receives as its destination score a portion of node 404's source score. In this case, the received score is 0.47. The second page reached from node 404 is node 412. Node 412 receives a destination score of 0.38. The third page reached from node 404 is node 414. Node 414 receives a destination score of 0.23. The final page reached from node 404 is node 416. Node 416 receives a destination score of 0.02. After traversing to node 416, the random walk teleports.

FIG. 4C illustrates a simplified embodiment of a portion of a process for assigning scores to a collection of documents based on a source set. A random walk beginning at node 406 is performed. The first page reached from node 406 is node 414. In this example, node 414 was already reached from node 402 as illustrated in FIG. 4B. As a result, the portion of node 406's source score (in this case, 0.27) is added to the portion of node 404's score (as shown in FIG. 4B, 0.23), for a total destination score of 0.50. The second page reached from node 406 is node 420. Node 420 receives a destination score of 0.18. The final page reached from node 406 before teleport is node 422. Node 422 receives a destination score of 0.03.

FIG. 4D illustrates a simplified embodiment of a portion of a process for assigning scores to a collection of documents based on a source set. A random walk beginning at 408 is performed. In this case, the first page reached from node 408 is another source seed node, node 404. Node 404 receives a destination score of 0.17. At this stage in the example, a random walk starting at each node in the seed set has been made.

FIG. 4E illustrates a simplified embodiment of a portion of a process for assigning scores to a collection of documents based on a source set. The process depicted in FIG. 4E could be an example of an implementation of 306 of FIGS. 3 and 508 of FIG. 5 as applied to collection 102. A source score for a page p can be calculated by determining the percentage of destination score that a page q has received from p and multiplying that by the destination score. The process is repeated for each q, and the results are summed. In the example shown, nodes 410, 414, 420, 416, and 412 have each received some portion of destination score from node 408. The source score of node 408 could thus be calculated as the percentage of destination score that node 410 received from node 408 multiplied by 0.47, summed with the amount of percentage of destination score that node 416 received from node 408 multiplied by 0.02, and so on.

Once source scores have been computed for each node in collection 102, a new seed set can be constructed. In some embodiments, all nodes with non-zero source scores are used to form the updated set S. In some embodiments, a threshold is applied. In that case, nodes not previously in S may be added to S if their source scores are large enough. In some embodiments, nodes previously in S whose source scores have decreased may be demoted out of set S. Once a new seed set has been constructed, the process can begin again, and additional computations, such as the additional iterations 508 and 510 of FIG. 5 can be performed.

FIG. 5 illustrates an embodiment of a process for assigning scores to a collection of documents based on a source set. In the example shown, the random surfer is modeled through an iterative process. The process begins at 502 when an unbiased stationary probability vector r is computed, such as through use of the formula given in Equation 2. At 504, each seed node in the source set is assigned a source seed score. The source and destination scores of the pages in collection 102 are optionally initialized, such as through use of the procedure discussed in conjunction with 304 of FIG. 3. In this example, the destination vector d is initialized to ρd and the source vector s is initialized to φs. Vectors b and z are initialized to 0.

At 506, destination scores are assigned to nodes reachable from the source seeds. One method for calculating destination scores is as follows:

$$b(p) = \beta \sum_{q \in In(p)} \frac{b(q)}{|Out(q)|} + \frac{(1-\beta)}{N} s(p) \quad (11)$$

-continued
$$d(p) = \rho d(p) + (1-\rho)b(p)$$

Where:
d(p) is the destination score of a page p
β is a probability, typically set to 0.85
In(p) is the set of inlinks of a page p
Out(q) is the set of outlinks of a page q
N is the total number of documents in the collection
ρ is a value between 0 and 1, inclusive (0≤ρ≤1)
φ is a value between 0 and 1, inclusive (0≤φ≤1)

In other examples other formulas are used to calculate the destination score. Other appropriate pairs of equations that define source and destination scores in terms of each other may be used. For example, in the embodiment depicted in FIG. 5, all links are treated equally. In some embodiments, link weights (e.g., weights assigned based on anchor text) are used to bias the computation of source and/or destination scores. At 508, nodes that reach nodes that have nonzero destination scores are assigned source scores. One method for calculating source scores is as follows:

$$z(p) = \frac{\beta}{|Out(p)|} \sum_{q \in Out(p)} z(q) + (1-\beta) \frac{d(p)}{r(p)} \quad (12)$$

$$s(p) = \phi s(p) + (1-\phi)z(p)$$

Where:
s(p) is the source score of a page p
d(p) is the destination score of a page p
r(p) is the unbiased stationary probability of a page p
β is a probability, typically set to 0.85
Out(p) is the set of outlinks of a page p
ρ is a value between 0 and 1, inclusive (0≤ρ≤1)
φ is a value between 0 and 1, inclusive (0≤φ≤1)

In other examples other formulas are used to calculate the source score, as appropriate.

At 510, nodes reachable from nodes having nonzero source scores are assigned destination scores. As used herein, "evaluation" nodes are nodes which have nonzero source scores, used to evaluate the destination score of a particular web node, or nodes which have nonzero destination scores, used to evaluate the source score of a particular web node. In some cases, evaluation nodes may be used for both purposes. In some embodiments, the process iterates through 508 and 510 until convergence. In some cases, such as where collection 102 is large, only a small number of iterations may be needed to achieve useful source and destination scores. In such cases, the process may be terminated before convergence.

Figure 6:
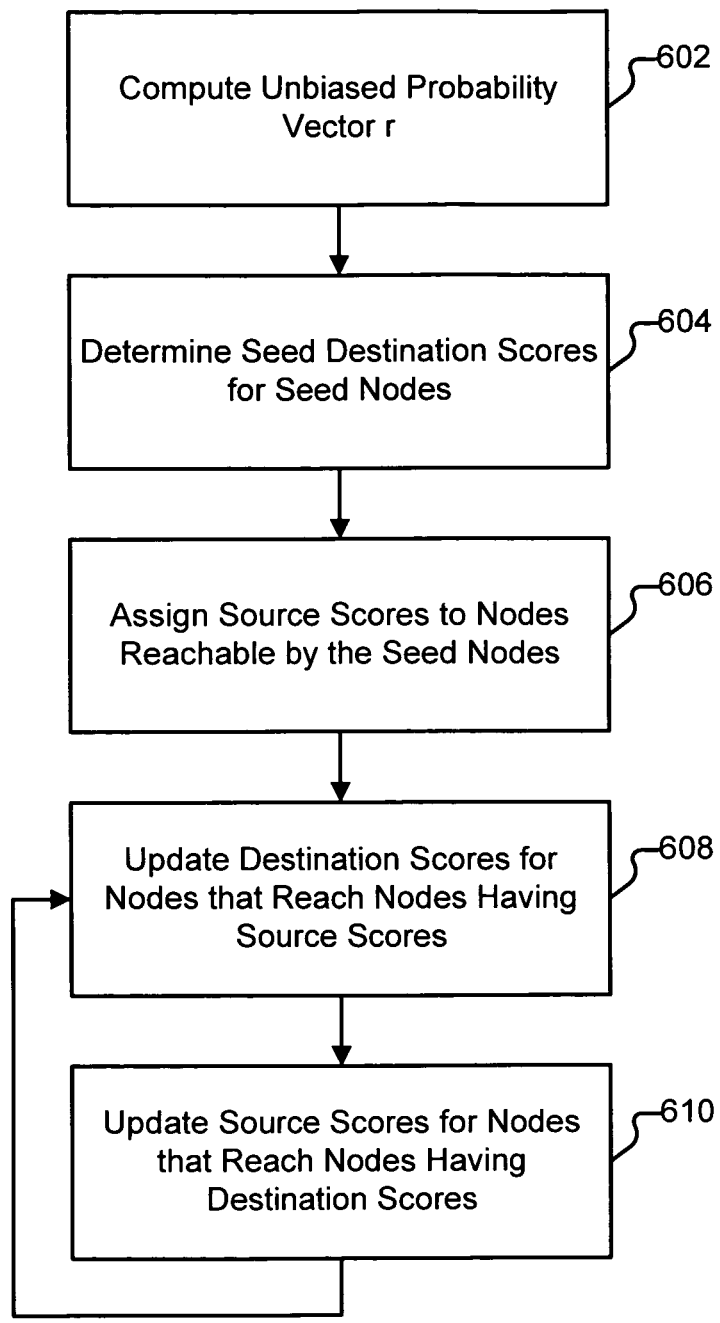
FIG. 6 illustrates an embodiment of a process for assigning scores based on a destination set.

FIG. 6 illustrates an embodiment of a process for assigning scores based on a destination set. The example shown can be used in cases where no known sources for a particular topic exist and the source seed set is empty. In that case, if a good destination or set of destinations is known, the destination set can be used to find a source set. For example, for a particular health topic, such as a rare blood disease, no source seed set may be known. It may nonetheless be known that particular sites are good destinations about the topic. A destination set can be used as appropriate to seed the process.

The process begins at 602 when an unbiased probability vector r is computed, such as through use of the formula given in Equation 2. At 604, each seed node in the destination set is assigned a seed destination score. The source and destination scores of the pages in collection 102 are optionally initialized, such as through use of the procedure discussed in conjunction with 304 of FIG. 3. In this example, the destination vector d is initialized to pd and the source vector s is initialized to φs. Vectors b and z are initialized to 0.

At 606, nodes that reach the destination seeds are assigned source scores as applicable. At 608, nodes that are reached by nodes that have nonzero source scores are assigned destination scores as applicable. At 610, nodes that reach destinations having nonzero destination scores are assigned source scores as applicable. In some embodiments, the process iterates through 608 and 610 until convergence. In some cases, such as where collection 102 is large, only a small number of iterations may be needed to achieve useful source and destination scores. In such cases, the process can be terminated before convergence.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of determining relevance of a web node comprising:
    computing, by a computer system, an unbiased probability vector for a collection of nodes, the collection of nodes comprising one or more seed nodes included within a seed set of nodes, the web node, and one or more evaluation nodes, the unbiased probability vector setting forth a plurality of reachability relationships, each corresponding to a different pair of nodes of the collection of nodes and setting forth a probability that a random surfer beginning on a first node of the different pair of nodes will end up on a second node of the different pair of nodes;
    assigning, by the computer system, one or more source score values to one or more seed nodes;
    setting, by the computer system, a source expansion factor to a value that allows some probability set forth in the unbiased probability vector with respect to the one or more seed nodes to spread out into other nodes within the collection of nodes, while retaining a portion of the probability within the one or more seed nodes;
    deriving, by the computer system, a destination score value for the web node based on a mapping of a reachability relationship of the plurality of reachability relationships between the one or more seed nodes and the web node; and
    deriving, by the computer system as limited by the source expansion factor, a source score value for the web node based on a mapping of a reachability relationship of the plurality of reachability relationships between the web node and the one or more evaluation nodes and based on a derived destination score associated, respectively, with each of the one or more evaluation nodes.

2. The method of claim 1 wherein a first seed node included in the seed set of nodes is assigned a first source score value and wherein a second seed node included in the seed set of nodes is assigned a second source score value.

3. The method of claim 1 wherein at least one seed node of the one or more seed nodes is also a web node.

4. The method of claim 1 wherein the destination score values associated with each of the one or more evaluation nodes are based at least in part on an exponential decay.

5. The method of claim 1 wherein deriving the destination score value for the web node is performed iteratively and includes summing results of multiple iterations with respect to the web node.

6. The method of claim 1 wherein deriving the destination score value for the web node is performed iteratively and includes averaging results of multiple iterations with respect to the web node.

7. The method of claim 1 further comprising updating the seed set of nodes.

8. A system for determining relevance of a web node comprising:
    one or more processors;
    memory operably connected to the one or more processors; and
    the memory storing one or more modules programmed to:
        compute an unbiased probability vector for a collection of nodes, the collection of nodes comprising one or more seed nodes included within a seed set of nodes, the web node, and one or more evaluation nodes, the unbiased probability vector setting forth a plurality of reachability relationships, each corresponding to a different pair of nodes of the collection of nodes and setting forth a probability that a random surfer beginning on a first node of the different pair of nodes will end up on a second node of the different pair of nodes;
        assign one or more source score values to the one or more seed nodes;
        set a source expansion factor to a value that allows some probability set forth in the unbiased probability vector with respect to the one or more seed nodes to spread out into other nodes within the collection of nodes, while retaining a portion of the probability within the one or more seed nodes;
        derive a destination score value for the web node based on a mapping of a reachability relationship of the plurality of reachability relationships between the one or more seed nodes and the web node; and
        derive, as limited by the source expansion factor, a source score value for the web node based on a mapping of a reachability relationship of the plurality of reachability relationships between the web node and the one or more evaluation nodes and based on a derived destination score associated, respectively, with each of the one or more evaluation nodes.

9. The system of claim 8 wherein the one or more processors are further configured to update the seed set of nodes.

10. The system of claim 8 wherein at least one web node that was not in the seed set of nodes is subsequently added to the seed set of nodes.

11. A computer program product for determining relevance of a web node, the computer program product being embodied in a non-transitory computer readable storage medium and comprising computer instructions for:
    computing an unbiased probability vector for a collection of nodes, the collection of nodes comprising one or more seed nodes included within a seed set of nodes, the web node, and one or more evaluation nodes, the unbiased probability vector setting forth a plurality of reachability relationships, each corresponding to a different pair of nodes of the collection of nodes and setting forth a probability that a random surfer beginning on a first node of the different pair of nodes will end up on a second node of the different pair of nodes;
    assigning one or more source score values to the one or more seed nodes;

setting a source expansion factor to a value that allows some probability set forth in the unbiased probability vector with respect to the one or more seed nodes to spread out into other nodes within the collection of nodes, while retaining a portion of the probability within the one or more seed nodes;

deriving a destination score value for the web node based on a mapping of a reachability relationship of the plurality of reachability relationships between the one or more seed nodes and the web node;

deriving, as limited by the source expansion factor, a source score value for the web node based on a mapping of a reachability relationship of the plurality of reachability relationships between the web node and the one or more evaluation nodes and based on a derived destination score associated, respectively, with each of the one or more evaluation nodes.

12. A method of determining relevance of a web node comprising:

computing, by a computer system, an unbiased probability vector for a collection of nodes, the collection of nodes comprising one or more seed nodes included within a seed set of nodes, the web node, and one or more evaluation nodes, the unbiased probability vector setting forth a plurality of reachability relationships, each corresponding to a different pair of nodes of the collection of nodes and setting forth a probability that a random surfer beginning on a first node of the different pair of nodes will end up on a second node of the different pair of nodes;

assigning, by the computer system, one or more destination score values to the one or more seed nodes;

setting, by the computer system, a destination expansion factor to a value that allows some probability set forth in the unbiased probability vector with respect to the one or more seed nodes to spread out into other nodes within the collection of nodes, while retaining a portion of the probability within the one or more seed nodes;

deriving, by the computer system, a source score value for the web node based on a mapping of a reachability relationship of the plurality of reachability relationships between the one or more seed nodes and the web node; and deriving, by the computer system as limited by the destination expansion factor, a destination score value for the web node based on a mapping of a reachability relationship of the plurality of reachability relationships between the web node and the one or more evaluation nodes and based on a derived source score associated, respectively, with each of the one or more evaluation nodes.

\* \* \* \* \*